United States Patent
Lee et al.

(10) Patent No.: US 6,950,456 B2
(45) Date of Patent: Sep. 27, 2005

(54) HIGH-SPEED CELL SEARCHING APPARATUS AND METHOD USING DPSK-BASED DISTRIBUTED SAMPLE ACQUISITION

(75) Inventors: Byeong Gi Lee, Seoul (KR); Byoung Hoon Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 865 days.

(21) Appl. No.: 09/738,312

(22) Filed: Dec. 18, 2000

(65) Prior Publication Data

US 2001/0004377 A1 Jun. 21, 2001

(30) Foreign Application Priority Data

Dec. 18, 1999 (KR) .......................... 1999-58958

(51) Int. Cl.[7] .............................................. H04B 1/707
(52) U.S. Cl. ........................ 375/146; 375/141; 375/147
(58) Field of Search ................................ 375/134, 137, 375/145, 149, 142, 150, 146, 141, 147; 370/320, 335, 342

(56) References Cited

U.S. PATENT DOCUMENTS

| | | | | |
|---|---|---|---|---|
| 5,724,384 A | * | 3/1998 | Kim et al. | ............ 375/149 |
| 6,151,353 A | * | 11/2000 | Harrison et al. | ............ 375/136 |
| 6,188,714 B1 | * | 2/2001 | Yamaguchi | ............ 375/130 |
| 6,389,058 B1 | * | 5/2002 | Lee et al. | ............ 375/141 |
| 6,668,009 B2 | * | 12/2003 | Lee et al. | ............ 375/141 |

* cited by examiner

Primary Examiner—Young T. Tse
(74) Attorney, Agent, or Firm—Fleshner & Kim, LLP

(57) ABSTRACT

A next-generation mobile communication system is disclosed, including a high-speed cell searching method and apparatus using a distributed sample acquisition scheme (DSA) and a differentially-coherent phase shift keying (DPSK)-based DSA (hereinafter referred to as $D^2SA$) in a direct sequence code division multiple access (DS/CDMA) system. The high-speed cell searching apparatus uses the $D^2SA$ technique using the $2^b$-ary DPSK modulation instead of the quadrature modulation to simultaneously convey b ($b \geq 1$) state samples for the SRG that generates the long-period PN sequences in the next-generation DS/CDMA system using the DSA technique, and employs the data constellation pre-rotation technique to provide the certainty of the channel estimation. A high-speed cell searching method using the apparatus is also provided.

22 Claims, 6 Drawing Sheets

HIGH-SPEED CELL SEARCHING APPARATUS AND METHOD USING DPSK-BASED DISTRIBUTED SAMPLE ACQUISITION

BACKGROUND OF THE INVENTION

1. Field of the Invention

The present invention relates generally to a next-generation mobile communication system. In particular, the present invention relates to a high-speed cell searching method and apparatus using a distributed sample acquisition scheme (DSA) and a differentially-coherent phase shift keying (DPSK)-based DSA (hereinafter referred to as $D^2SA$) in a direct sequence code division multiple access (DS/CDMA) system.

2. Background of the Related Art

Generally, in a DS/CDMA communication system, a receiver is required to synchronize (Psuedo-Noise) PN sequences prior to detection of data. Mostly, the PN sequence synchronization is performed by two steps of code acquisition and code tracking in sequence. Here, regarding the code acquisition, research for a high-speed acquisition technique to shorten the acquisition time has been made with great interest and anxiety.

The most basic code acquisition technique proposed up to now is a serial search. This method has an advantage that its implementation is not complex, but has a disadvantage that since the acquisition time is directly proportional to the period of the PN sequence being used, acquisition time is quite long when the period of the PN sequence is long.

Meanwhile, a parallel search has been proposed to acquire the PN sequences having a long period. However, this parallel search has a disadvantage that its implementation becomes complicated in proportion to the reduced acquisition time.

Ultimately, a hybrid method, which properly balances the acquisition speed and the complexity of implementation by adequately combining the serial search and the parallel search for the high-speed acquisition of the PN sequences, has been proposed. Another high-speed acquisition method based on state estimation of a shift register generator (SRG) has been proposed as well.

The acquisition technique based on the state estimation of the SRG acquires rapid acquisition by sequential estimation. This technique sequentially performs a hard detection of the received PN sequences a large number of times, carries them as temporary register state values of the receiving part SRG, and then finally decides whether or not it is synchronized through a confirming process. In theory, this technique has an advantage that it can greatly reduce the acquisition time without increasing the implementation complexity in comparison to the serial search. However, it has a disadvantage that its performance abruptly deteriorates when it is based on a coherent detection of the PN sequences and has a low signal-to-noise ratio (SNR). Thus, it is improper to apply this technique in a general code division multiple access (CDMA) environment.

Because of this, an acquisition technique based on a new state estimation has been proposed. This technique, named a distributed sample acquisition (DSA) technique, reduces the acquisition time of the long-period PN sequences using hardware having minimal complexity in the conventional DS/CDMA type cellular system.

According to this DSA technique, the transmitting part generates an igniter sequence having a relatively short period, and transmits the igniter sequence with state samples of the long-period PN sequences being carried thereon. The receiving part first acquires the igniter sequence, demodulates the state samples carried thereon, and corrects the SRG state of the receiver through a comparison-correction circuit at every accurate time point. In this way, synchronization of the PN sequences is performed.

A pair of SRGs having the same structure are provided in the transmitting/receiving part to perform the synchronization by carrying the same state values, i.e., L values stored in the SRG having the length of L. Therefore, they can transfer the state samples of the transmitting part SRG to the receiving part using the DSA technique. As a result, this technique can acquire the PN sequence much faster than the existing technique that performs the synchronization at the time point where the maximum correlation value for the PN sequences is detected.

Since the high-speed acquisition using the DSA technique as described above is performed prior to the phase estimation of the carrier, coherent demodulation cannot be used for transferring information. Thus, an orthogonal modulation has been conventionally used for modulating information. According to the conventional high-speed acquisition using the DSA, the orthogonal modulation which uses $2^b$-ary orthogonal symbols to simultaneously transfer b ($b \geq 1$) state symbols for the SRG that generates the long-period PN sequences has been employed.

As a result, in the conventional base station (i.e., transmitter), $2^b$-ary orthogonal symbols corresponding to the b state symbols for the SRG are generated at the respective sampling time points, and these symbols are spread by the relatively short-period igniter sequences to broadcast them through a pilot channel.

Meanwhile, in the mobile station (i.e., receiver), $2^b$ correlators (or, matched filters) are used for acquiring the igniter sequence. Specifically, the mobile station confirms whether the maximum value among the correlator output energies for each phase exceeds a predetermined threshold value as it changes the phase of the igniter sequence. If the maximum value of the $2^b$ correlator output energies exceeds the threshold value for a specified phase, the mobile station declares that the igniter sequence is acquired, and then confirms which correlator has the maximum output energy in a state that the phase of the sequence is fixed. Then, the detection of the $2^b$-ary quadrature symbols is performed. Finally, the synchronization of the scrambling sequence is effected by decoding the detected quadrature symbols into b state samples, and using these state samples for the state correction of the mobile station SRG (it generates the long-period PN sequences).

FIG. 1 is a block diagram illustrating the selective structure of a related art parallel sampling despreader provided in a receiver in the next-generation DS/CDMA system using the general quadrature-modulation-based DSA technique. FIGS. 2A and 2B are drawings illustrating respective operation modes of a decision logic circuit used in the related art next-generation DS/CDMA system using the general quadrature-modulation-based DSA technique. Specifically, FIG. 2A shows the decision logic circuit which operates in an igniter sequence acquisition mode, and FIG. 2B shows the decision logic circuit which operates in a state sample detection mode.

The state signal r(t) having arrived at the receiving part is despread by $2^b$ quadrature symbol correlators, integrated for a symbol time with integrators 60, 61 and 62) and then converted into input values $|Y_j|(j=0, 1, \ldots, 2b-1)$ of the $2^b$ decision logic circuits by taking their absolute values. In the actual implementation, the absolute value is generally obtained via absolute value units 63, 64 and 65 by multiplying the in-phase (I-phase) value and the quadrature-phase (Q-phase) value of the output of the integrating section and then obtaining a square root value thereof. At this time, the correlation signal used for correlating with the state signal in the j-th quadrature symbol correlator is a conjugate complex signal of the spread quadrature signal $m_j(t)$, that is obtained by multiplying the quadrature symbol signal $s_j(t)$ and the igniter sequence signal $c(t)$ used for the quadrature modulation in the transmitting part. The value $|Y_j|(j=0, 1, \ldots, 2b-1)$ are then input to the decision logic section 69.

FIGS. 2A and 2B illustrate the operation of the decision logic section 69 in FIG. 1. The decision logic circuit operates differently in the igniter sequence acquisition mode and in the state sample detection mode. In the igniter sequence acquisition mode (i.e., the step prior to the igniter sequence acquisition), the maximum value among the $2^b$ input values $|Y_j|(j=0, 1, \ldots, 2^b-1)$ is compared with the predetermined threshold value $R_0$. If the maximum value is larger than the threshold value, the decision logic circuit declares the sequence phase consistent state $H_1$, and goes to the acquisition confirmation step. If the maximum value is smaller than the threshold value, the decision logic circuit declares the sequence phase discrepant state $H_0$, and checks whether the next sequence phase is consistent.

In the state sample detection mode (i.e., the step after the igniter sequence acquisition), the decision logic circuit determines which value is the maximum value among the $2^b$ input values $|Y_j|(j=0, 1, \ldots, 2^b-1)$, and detects the corresponding quadrature state symbol $S_j$. This state symbol is demapped by b state samples.

The high-speed acquisition using the related art DSA technique has various problems. For example, if the number (b) of the state samples simultaneously sampled and transmitted by the SRG that generates the long-period PN sequences is increased, the number of the correlators to operate simultaneously is geometrically increased in the mobile station.

This not only increases the hardware complexity, but also brings unsatisfactory results in the performance of the igniter sequence acquisition.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention to provide a high-speed cell searching apparatus and method for a communication system that substantially obviates one or more of the problems due to limitations and disadvantages of the related art.

Another object of the present invention is to provide a high-speed cell searching apparatus, which employs the $D^2SA$ technique using the $2^b$-ary DPSK modulation instead of the quadrature modulation and a high-speed cell searching method using the apparatus.

Another object of the present invention is to provide a high-speed cell searching apparatus, which can simultaneously convey b ($b \geq 1$) state samples for the SRG that generates the long-period PN sequences in the next-generation DS/CDMA system using the DSA technique and a high-speed cell searching method using the apparatus.

Another object of the present invention is to provide a high-speed cell searching apparatus, which employs a data constellation pre-rotation technique to provide the certainty of the channel estimation, and a high-speed cell searching method using the apparatus.

To achieve at least these objects in whole or in parts, the present invention, as embodied and broadly described, provides a high-speed cell searching method using a $D^2SA$ technique, comprising the steps of pre-sampling b state values of a sequence generator that generates one or more main sequences, differential phase shift keying (DPSK)-modulating the sampled state values, multiplying respective user data by the DPSK-modulated symbol values, transmitting a state signal obtained by spreading the DPSK-modulated symbol values by a generated igniter sequence, and transmitting a data signal obtained by modulating the respective user data multiplied by the DPSK-modulated symbol values, synchronizing states of the respective transmitter and receiver sequence generators after acquiring the igniter sequence from the transmitted state signal, and tracking and estimating gains of a pilot channel and a traffic channel and a carrier phase after synchronization.

To achieve at least these objects, in whole or in parts, there is further provided a high-speed cell searching apparatus using a $D^2SA$ technique, comprising a transmitter which samples a plurality of state values by generating one or more first main sequence, modulates the state samples into differential phase shift keying symbols, spreads the modulated symbols by a first igniter sequence, and transmits the spread symbols, the transmitter spreading the constellation pre-rotated user data by a scrambling sequence using the main sequence, and transmitting the spread user data, and a receiver which acquires the corresponding igniter sequence from the state signal outputted from the transmitter, despreads the state signal by the acquired igniter sequence, demodulates the despread state signal, synchronizes its respective sequence generators by comparing state sample values of the sequence generators which generate one or more second main sequences with the demodulated state sample values, and despreads and descrambles the user data from the transmitter using second main sequence corresponding to the synchronization timing and a channel estimator.

To achieve at least these objects, in whole or in parts, there is further provided a high-speed cell searching apparatus using a $D^2SA$ technique, comprising a DSA spreading section for pre-sampling b state values of a sequence generator that generates one or more main sequences, and spreading and scrambling user data whose constellation is pre-rotated by scrambling sequences generated using the main sequences, a sample spreading section for modulating the state samples outputted from the DSA spreading section to differential phase shift keying (DPSK) symbols, and spreading the modulated symbols by the igniter sequence to output the spread symbols, a sample despreading section for acquiring the corresponding igniter sequence from the state signal outputted from the sample spreading section, despreading the input state signal by the acquired igniter sequence, and modulating the despread state signal, a DSA despreading section for synchronizing the transmitter and receiver sequence generators by comparing state sample values of its sequence generator that generates one or more main sequences with the state sample values demodulated by the sample despreading section, and despreading and descrambling the spread user data by a descrambling sequence generated using the main sequence corresponding to the synchronization timing, and a channel estimator for estimating a channel gain and a carrier phase by multiplying an encoded output by the state signal despread by the sample despreading section and then multiplying a spread output by a low-pass-filtered value.

The DSA spreading section preferably comprises one or more main SRGs for generating the main sequences, time-advanced parallel sampling section for pre-sampling states of the main SRGs, a scrambler for scrambling the input user data by a scrambling code generated from the main sequences, and a multiplier for multiplying the input user data by the DPSK symbol in which the phase integrated until the previous symbol time is added to the phase of the present symbol.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the high-speed cell searching method and apparatus using the $D^2SA$ technique according to the preferred embodiment of the present invention, examples of which are illustrated in the accompanying drawings.

The preferred embodiment performs a high-speed discrimination and acquisition of the long-period PN sequences by applying the $D^2SA$ technique to the next-generation DS/CDMA system, and solves the uncertainty problem of the channel estimation, which is caused by the pilot signal generated due to the use of the DPSK modulation in the base station, by the pre-rotation of the data constellation as well.

Specifically, the preferred embodiment uses the DPSK modulation to convey the state samples of the SRG to the $D^2SA$ technique, and employs the pre-rotation of data constellation to realize the coherent modulation of the user data.

According to the preferred embodiment, the DPSK modulation is used to convey the b (b≧1) state samples for the SRG, and the code acquisition is performed using one correlator without the necessity of recognizing the carrier phase. It is noted that, according to the related art DSA technique, $2^b$ correlators are used when b state samples for each state symbol are conveyed.

Hereinafter, the origination and operation of the $D^2SA$ technique using the DPSK modulation according to a preferred embodiment of the present invention, and the data constellation pre-rotation concept will be described.

Figure 1:
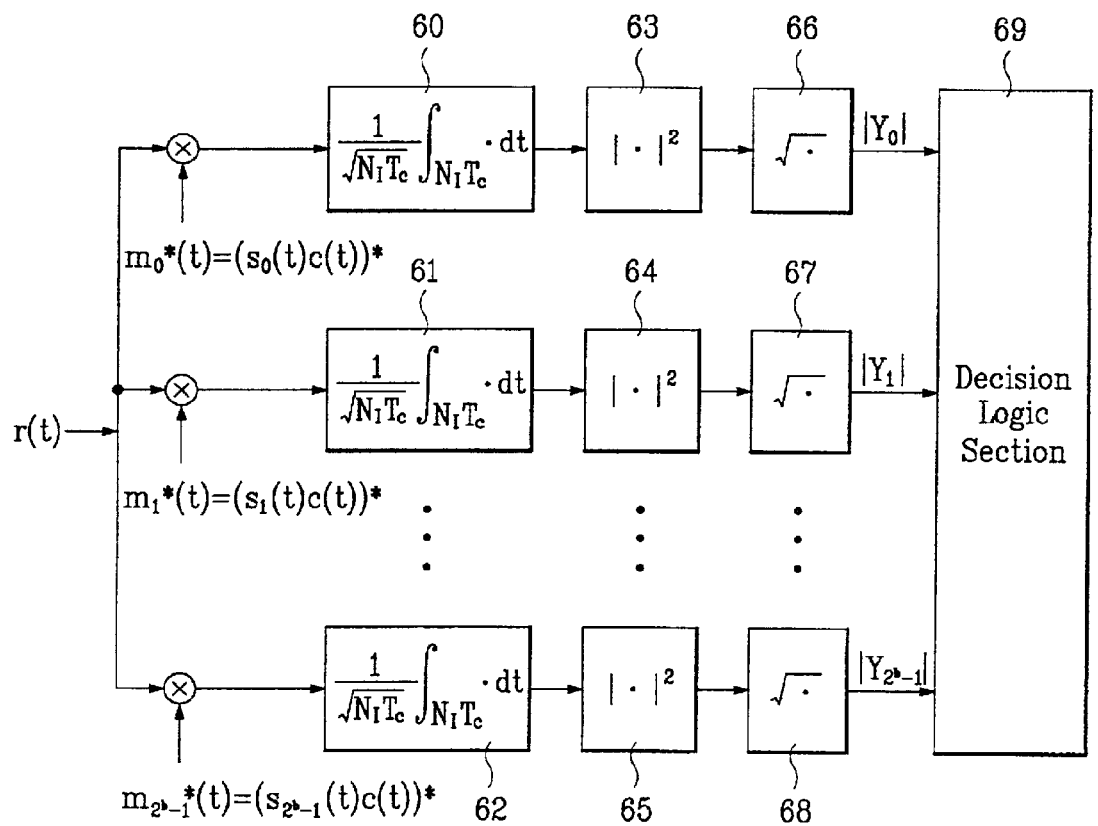
FIG. 1 is a block diagram illustrating a relative art selective structure of a parallel sampling despreader provided in a receiver in the next-generation DS/CDMA system using the general quadrature-modulation-based DSA technique.
Figure 2A:
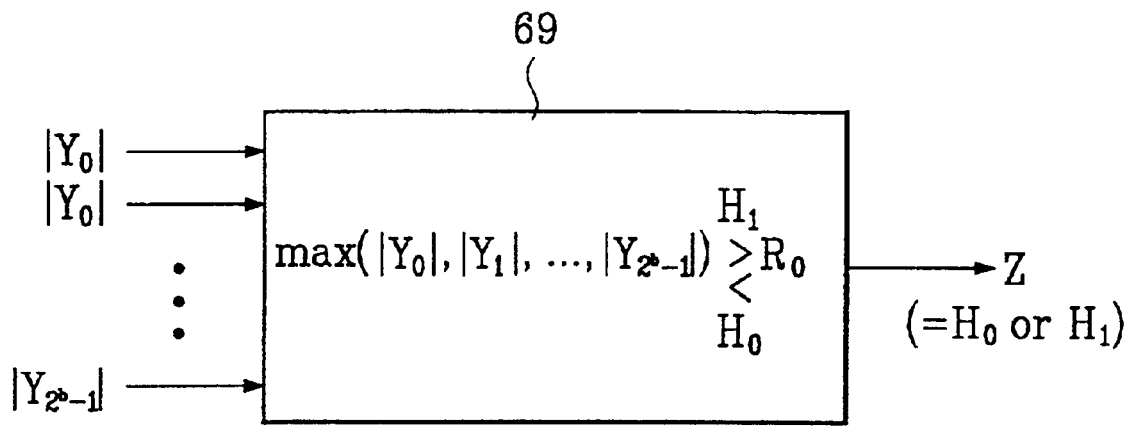
FIG. 2A is a drawing illustrating a related art decision logic circuit operating in an igniter sequence acquisition mode used in the next-generation DS/CDMA system using the general quadrature-modulation-based DSA technique.
Figure 2B:
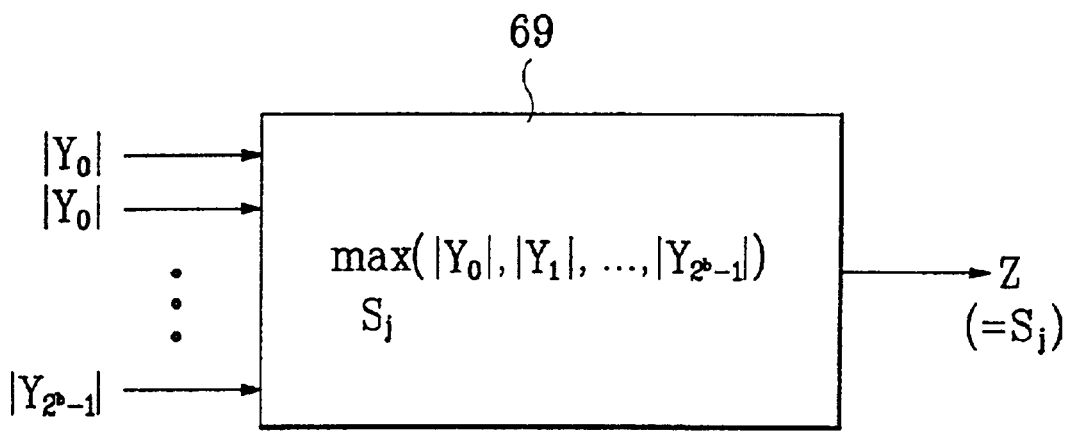
FIG. 2B is a drawing illustrating a related art decision logic circuit operating in an state sample detection mode used in the next-generation DS/CDMA system using the general quadrature-modulation-based DSA technique.
Figure 3A:
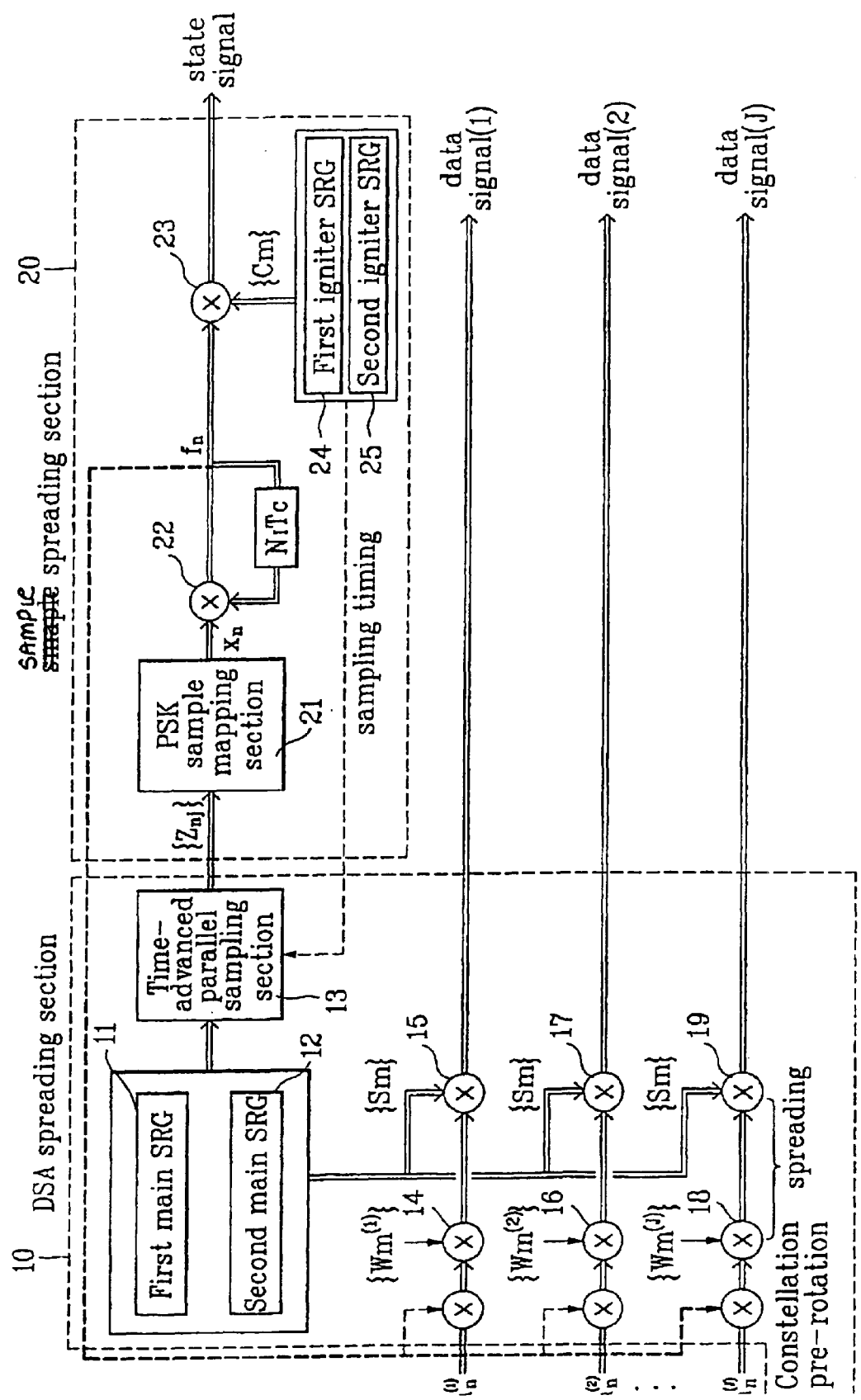
FIG. 3A is a block diagram illustrating the partial construction of a transmitter of the next-generation DS/CDMA system using the $D^2SA$ technique according to a preferred embodiment of the present invention.
Figure 3B:
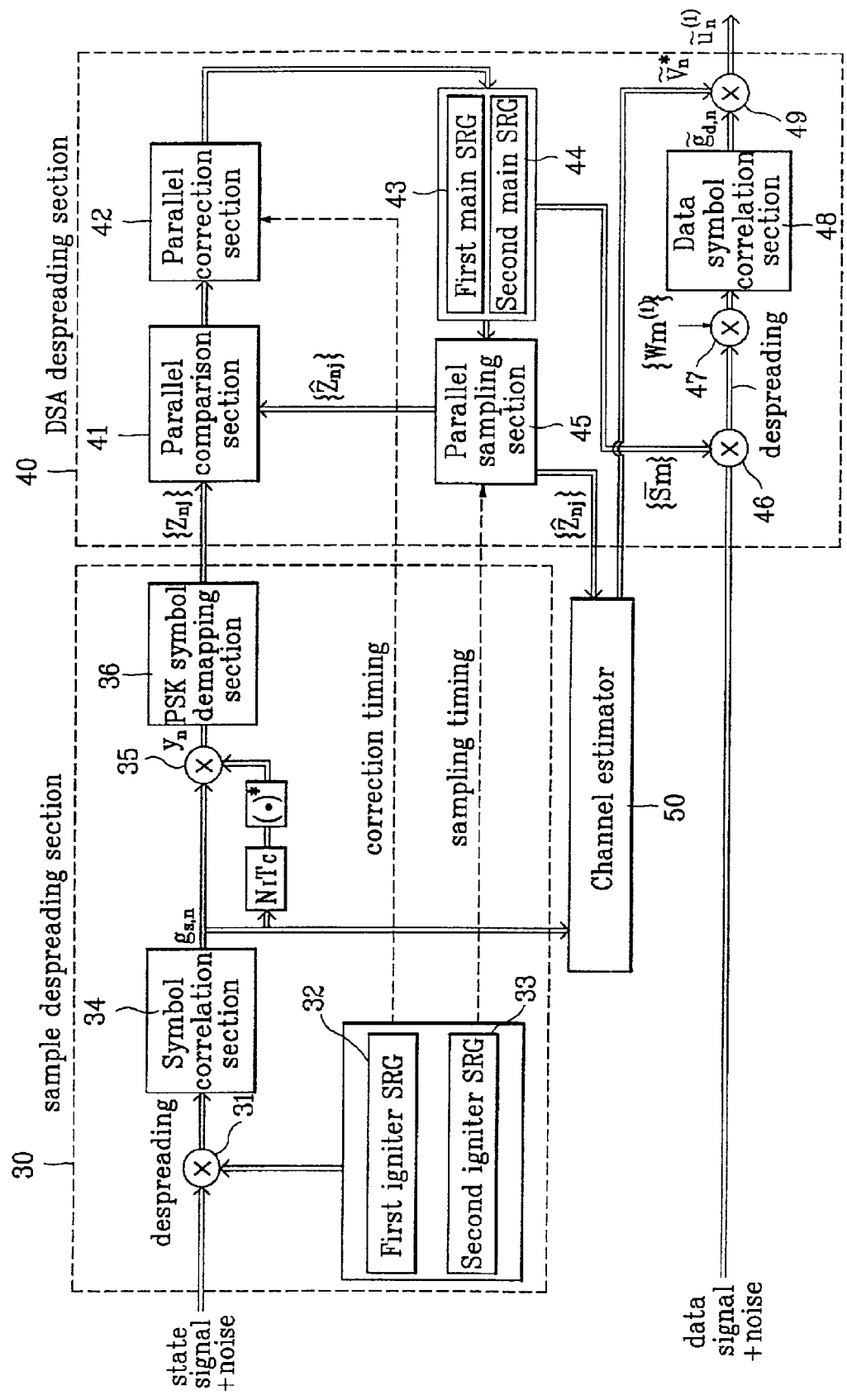
FIG. 3B is a block diagram illustrating the partial construction of a receiver of the next-generation DS/CDMA system using the $D^2SA$ technique according to a preferred embodiment of the present invention.

FIGS. 3A and 3B are block diagrams illustrating partial construction of the next-generation DS/CDMA system using the $D^2SA$ technique according to a preferred embodiment of the present invention. FIG. 3A is a block diagram illustrating the partial construction of the $D^2SA$ transmitter (i.e., base station), and FIG. 3B is a block diagram illustrating the partial construction of the $D^2SA$ receiver (i.e., mobile station).

The $D^2SA$ transmitter/receiver illustrated in FIGS. 3A and 3B preferably have two function blocks. One is a sample spreading section/sample despreading section 20/30, and the other is a DSA spreading section/DSA despreading section 10/40.

The DSA spreading section 10 and the DSA despreading section 40 perform the synchronization of the main sequences, and the sample spreading section 20 and the sample despreading section 30 perform the conveyance of the state samples. Their functions are preferably implemented by main SRGs 11, 12, 43, and 44 provided in the DSA spreading section 10 and the DSA despreading section 40, respectively, and by igniter SRGs 24, 25, 32, and 33 provided in the sample spreading section 20 and the sample despreading section 30, respectively.

The igniter sequence generated from the respective igniter SRGs 24, 25, 32, and 33 is an auxiliary sequence introduced to help the synchronization of the main sequence. The igniter sequence reliably conveys the state values of the main SRGs 11 and 12 to the receiver. It also provides the basis of timing for the sampling and correction of the SRG state in the receiver.

The transmitter illustrated in FIG. 3A preferably includes the DSA spreading section 10 for pre-sampling a plurality of state values of a sequence generator that generates one or more main sequences, and spreading and scrambling user data whose constellation is pre-rotated by scrambling sequences generated by using the main sequences. It further preferably includes the sample spreading section 20 for modulating the state samples outputted from the DSA spreading section 10 to differential phase shift keying (DPSK) symbols, and spreading the modulated symbols by the igniter sequence to output the spread symbols.

The DSA spreading section 10 in the transmitter preferably comprises a plurality of main SRGs 11 and 12 for producing the main sequences, and a time-advanced parallel sampling section 13 for sampling states of the main SRGs 11 and 12 in conformity with the sampling timing. It also preferably includes a plurality of spreaders 14, 16, and 18 for spreading user data externally inputted by a quadrature Walsh code, and a plurality of scramblers 15, 17, and 19 for scrambling again the user data signal spread by the quadrature Walsh code by complex type scrambling sequences.

The sample spreading section 20 of the transmitter preferably includes a PSK symbol mapping section 21 for mapping the state samples outputted from the time-advanced parallel sampling section 13 onto a code symbol and outputting a corresponding PSK symbols $X_n$. It also preferably includes the DPSK encoding section 22 for encoding the DPSK symbols $f_n$ by adding the phase integrated until the previous symbol time to the phase of the PSK symbol $X_n$ outputted from the PSK symbol mapping section 21. Additionally, it preferably includes the igniter SRGs 24 and 25 for generating igniter sequences to spread the generated DPSK symbols $f_n$, and a spreader 23 for spreading the DPSK symbols $f_n$ by the complex igniter sequence and outputting the state signal.

The receiver illustrated in FIG. 3B preferably includes the sample despreading section 30 for acquiring the corresponding igniter sequence from the state signal outputted from the sample spreading section 20, despreading the input state signal by the acquired igniter sequence, and demodulating the despread state signal. It also preferably includes the DSA despreading section 40 for synchronizing the transmitter/receiver sequence generators by comparing state sample values of its own sequence generator that generates one or more main sequences with the state sample values demodulated by the sample despreading section 30, and despreading and descrambling the spread user data by a descrambling sequence generated using the main sequence corresponding to the synchronization timing. Next, the receiver also preferably includes a channel estimator 50 for estimating a channel gain and a carrier phase by multiplying a value obtained by DPSK-encoding the state sample values for the sequence generator of the DSA despreading section 40 by a value obtained by multiplying the encoded output by the state signal despread by the sample despreading section 30, and then multiplying a multiplied value by a low-pass-filtered value.

Figure 4A:
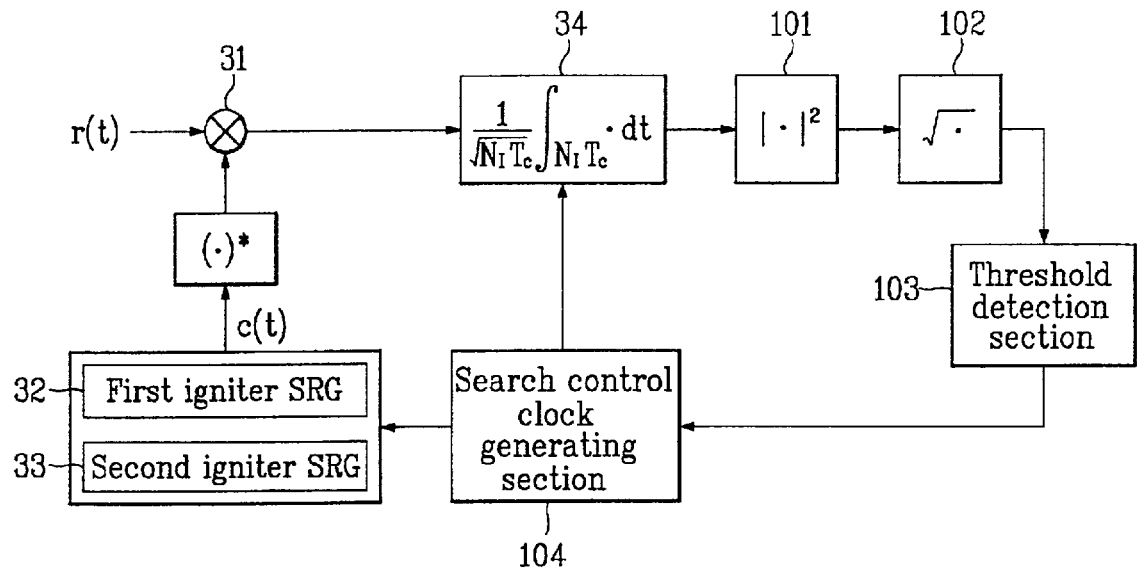
FIG. 4A is a block diagram illustrating the noncoherent acquisition detector for obtaining/acquisition of the igniter sequence according to a preferred embodiment of the present invention.
Figure 4B:
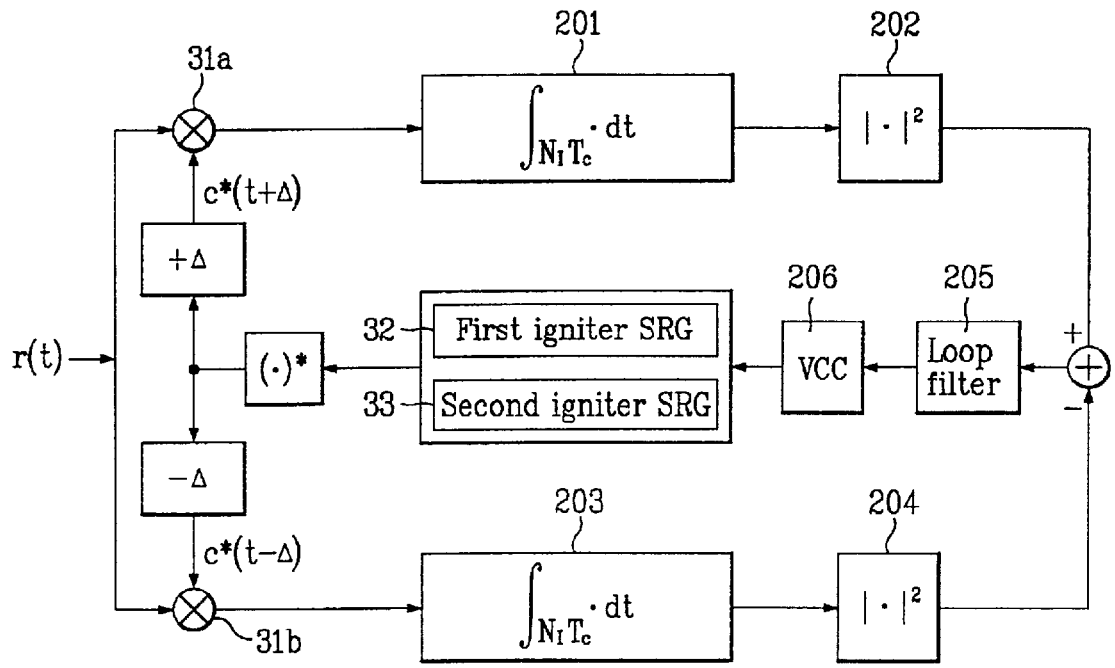
FIG. 4B is a block diagram illustrating the noncoherent delay-locked loop (DLL) for code acquisition according to a preferred embodiment of the present invention.

The sample despreading section 30 of the receiver, as shown in FIG. 4A, preferably includes a signal noncoherent acquisition detector for obtaining the DPSK-modulated igniter sequences using only one correlator. This single noncoherent acquisition detector preferably employs a series (or parallel) searching method. If the igniter sequence acquisition is completed, an accurate chip timing is traced using the noncoherent delay-looked loop (DLL) illustrated in FIG. 4B. Meanwhile, the noncoherent DLL of FIG. 4B is selectively used.

In the receiver including a block for performing the synchronization of the igniter sequence, the sample despreading section 30 preferably further includes the igniter SRGs 32 and 33 for producing the igniter sequences, a despreader 31 for despreading the state signal received from the igniter sequences produced from the igniter SRGs 32 and 33, and a symbol correlation section 34 for performing a correlation detection with respect to the state signal despread by the igniter sequences. The sample despreading section 30 preferably also includes a decoding section 35 for DPSK-decoding the output value $g_{s,n}$ of the symbol correlation section 34 and a PSK symbol demapping section 36 for detecting the symbols decoded by the decoding section 35 and outputting the state samples.

The DSA despreading section 40 of the receiver preferably includes one or more main SRGs 43 and 44 for producing the main sequences, and a parallel sampling section 45 for sampling the states of the main SRGs 43 and 44 in conformity with the sampling timing provided from the igniter SRGs 32 and 33. The DSA despreading section 40 further includes a parallel comparing section 41 for comparing the state samples outputted form the PSK symbol demapping section 36 with the state samples outputted from the parallel sampling section 45, and a parallel correction section 42. The parallel correction section 42 repeatedly corrects the states of the main SRGs 43 and 44 in accordance with a correction timing provided from the igniter SRGs 32 and 33 and a comparison result of the parallel comparing section 41. At this time, the main SRGs 43 and 44 make their states coincide with the states of the main SRGs 11 and 12 of the transmitter in accordance with the output of the parallel correction section 42.

The DSA despreading section 40 preferably further includes a descrambler 46 for descrambling the data signal received from the DSA spreading section 10 of the transmitter by the complex type descrambling sequences generated from the main SRGs 43 and 44, and a despreader 47 for despreading the signal descrambled by the scrambling sequences by the quadrature Walsh code. Also includes is a data symbol correlation section 48 for correlation-integrating the signal despread by the quadrature Walsh code through the despreader 47 in the unit of a data symbol, and a multiplier 49 for multiplying the estimation value of the channel estimator by the output of the data symbol correlation section 48 and outputting a finally synchronized data signal.

Figure 5:
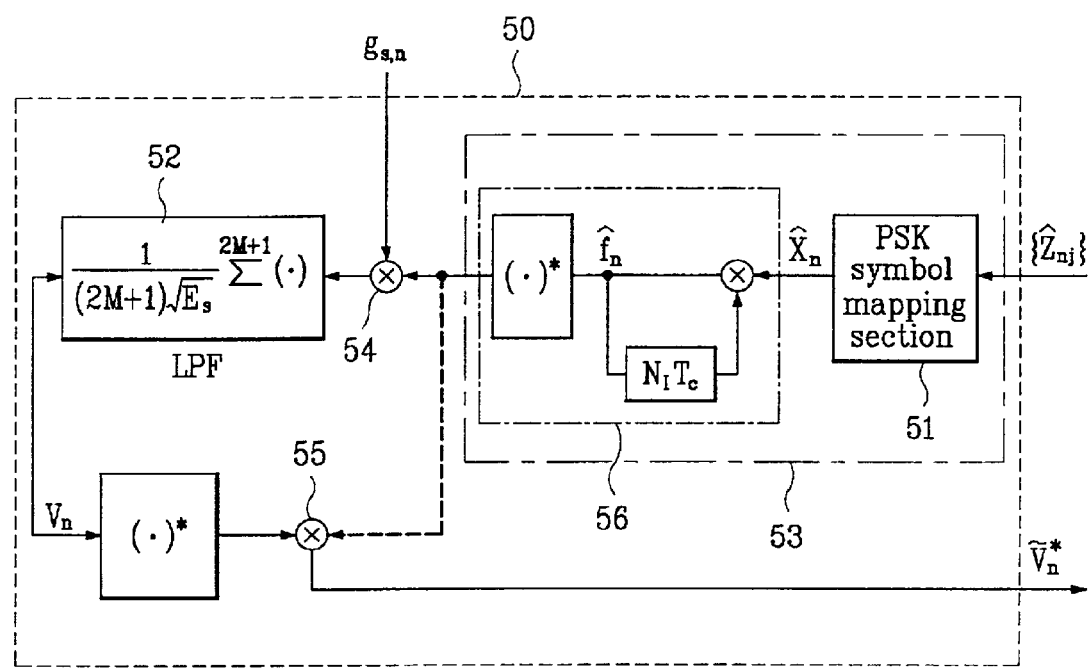
FIG. 5 is a block diagram illustrating the construction of the channel estimator provided in the receiver in the next-generation DS/CDMA system using the $D^2SA$ technique according to a preferred embodiment of the present invention.

FIG. 5 is a block diagram illustrating a construction of the channel estimator provided in the receiver in the next-generation DS/CDMA system using the $D^2SA$ technique according to a preferred embodiment of the present invention.

The channel estimator 50 provided in the receiver in the next-generation DS/CDMA system using the $D^2SA$ technique preferably includes a depletion encoding section 53 for depletion-encoding the state samples outputted from the DSA despreading section 40, and a first multiplier 54 for multiplying the state signal value $g_{s,n}$ correlation-detected by the symbol correlation section 34 of the sample despreading section 30 by the value Fn outputted from the depletion encoding section 53. It also includes a filtering section (LPF) 52 for removing noise from the value computed by the first multiplier 54, and a second multiplier 55 for multiplying the value outputted from the filtering section 52 by the value outputted from the depletion encoding section 53 and outputting the channel estimation value to restore the signal before the constellation pre-rotation in the transmitter.

The depletion encoding section 53 preferably comprises a PSK symbol mapping section 51 for mapping the state samples outputted from the parallel sampling section 45 of the DSA despreading section onto the respective complex symbols and outputting the state symbol Xn which is the corresponding PSK symbol, and an encoding section 56 for producing the DPSK symbol Fn by adding the phase integrated until the previous symbol time to the phase of the PSK symbol Xn. The high-speed cell searching apparatus using the $D^2SA$ technique according to the present invention will be described with reference to FIGS. 3A and 3B.

Referring to FIG. 3A, in the transmitter, the main SRGs 11 and 12 having a length of L generate the scrambling sequences (Sm). Here, the scrambling sequence is a complex sequence having a period of $2^L-1$ or a short period that is composed of a part of the period, and is $Sm=S_{I,m}+jS_{Q,m}$.

Also, in the transmitter, the igniter SRGs 24 and 25 having a length of S generate the igniter sequences ($C_m$). The igniter sequence $Sm=C_{I,m}+jC_{Q,m}$ preferably has a period of $N_I=2^S$, and is used for spreading the state information of the first SRGs 11 and 12.

In the transmitter, the time-advance parallel sampling section 13 obtains the state samples $Z_{nj}$ (J=1, 2, . . . , b−1) from the outputs of the first and second main SRGs 11 and 12 at the time point of $(R+n-1)N_I$ with respect to a reference value R using the sampling timing provided from the igniter SRGs 24 and 25 (i.e., when b state sample from the SRG are simultaneously sampled and transmitted). The sampling timing provided from the igniter SRGs 24 and 25 is for determining every time point during sampling. Thereafter, the state samples $Z_{nj}$ are provided to the PSK symbol mapping section 21 for the DPSK modulation.

At this time, the obtained state sample values are the main sequence values to be generated from the main SRGs 11 and 12 at the time point of $(R+n)N_I$. This is because the time-advance parallel sampling section 13 pre-samples at the time point of $(R+n-1)N_I$ the state samples $Z_{nj}$ to be generated from the main SRGs 11 and 12 at the time point of $(R+n)N_I$.

The PSK symbol mapping section 21 maps the two provided state samples onto the respective complex symbols and outputs corresponding state symbols $X_n$ which are the PSK symbols.

Then, the block following the PSK symbol mapping section 21 performs the DPSK encoding. At this time, DPSK symbols $f_n$ are generated by adding the phase, integrated through the previous symbol time, to the phase of the PSK symbols $X_n$.

As a result, the DPSK symbols $f_n$ are spread by the complex type igniter sequences ($C_m$) generated from the igniter SRGs 24 and 25, and then transmitted to the receiver through a pilot channel PI-CH at prescribed intervals. This is the state signal.

On the contrary, in the transmitter, respective M-ary user data ($a_i^{(1)}$, $a_i^{(2)}$, . . . , $a_i^{(J)}$) is spread by the quadrature Walsh code ($w_m^{(1)}$, $W_m^{(2)}$, . . . , $W_m^{(J)}$), scrambled by the scrambling sequence ($S_m$) commonly used for the respective user data in the transmitter before being transmitted, and then transmitted to the receiver through the traffic channel T-CH. This is the data signal.

Specifically, according to the preferred embodiment, the respective M-ary user data ($a_i^{(1)}$, $a_i^{(2)}$, . . . , $a_i^{(J)}$) before being spread by the quadrature Walsh code is multiplied by the DPSK symbols $f_n$, which are generated by adding the phase integrated through the previous symbol time to the phase of the PSK symbols $X_n$. Accordingly, the DSA spreading section 10 further includes a plurality of multipliers (not illustrated) for pre-rotating data constellation by multiplying the user data of the respective paths by the encoded DPSK symbols $f_n$. By this pre-rotation of data constellation, the absolute phase value for each time point of the DPSK modulator for generating the transmitter state signal is also carried on the data signal to be conveyed to the receiver.

Referring to FIG. 3B, the receiver, which receives the transmitted state signal and data signal, first obtains the igniter sequences using the noncoherent acquisition detector illustrated in FIG. 4A. This noncoherent acquisition detector is a serial correlator which obtains the DPSK-modulated igniter sequences using a single correlator. This is used in the event that the state signal obtained by spreading the DPSK symbol $f_n$ by the igniter sequence ($C_m$) is transmitted to the receiver through the pilot channel PI-CH.

The single correlator structure is possible because the transmitter uses the DPSK modulator instead of the $2^b$-ary quadrature modulator, and the receiver uses the DPSK demodulator.

Next, the operation of the noncoherent acquisition detector illustrated in FIG. 4A will be described.

The received state signal is despread by the igniter sequence generated by the igniter SRGs 32 and 33, and then correlation-integrated via an integrator 101, absolute value unit 101 and square root value 102.

Thereafter, a threshold detection section 103 detects whether the output of the symbol correlation section 34 exceeds the predetermined threshold value $R_0$. At this time, the acquisition detector of FIG. 4A repeatedly performs the correlation-based search as it shifts the igniter sequence generated from the igniter SRGs 32 and 33 in accordance with the clock signal provided from a search control clock generating section 104 until the output of the symbol correlation section exceeds the threshold value and declares the in-phase state.

Once the in-phase state is declared, the process of verifying the igniter sequence is performed. In verifying the igniter sequence, energies of the $V_I$ despread state symbols are noncoherently added, and then compared with another predetermined threshold value $R_1$. If the added energy exceeds the threshold value $R_1$, the igniter sequence verification is realized. If a system uses a plurality of igniter sequences, an igniter sequence discriminating process, which discriminates that the current cell, uses the igniter sequence having the maximum energy. Through this verification, the igniter sequence discrimination and synchronization is completed, and then a correlation process for the main SRGs to be explained later is performed.

After the igniter sequence discrimination and synchronization is completed, an accurate chip timing is estimated using the noncoherent delay-locked loop (DLL) illustrated in FIG. 4B. Further. FIG. 4B also illustrates despreaders 31a, 31b; correlation sections 201, 203; integrators 202, 204; vcc 206; and loop filter 205.

Referring to FIG. 3B, if the igniter code and the igniter code timing of the present cell are obtained using the serial correlator, i.e., the igniter sequence timing is fixed, an output $g_{s,n}$ of the symbol correlation section 34, which is despread by the complex type igniter sequence $C_m$ generated from the igniter SRGs 32 and 33, is DPSK-decoded and inputted to the PSK symbol demapping section 36.

The PSK symbol demapping section 36 detects different state sample values $Z_{nj}$ from the symbols decoded for the state correction of the main SRGs 43 and 44. These sample values are conveyed to the DSA despreading section 40 at the time point of $(R+n)N_I$.

Next, the parallel comparing section 41 of the DSA despreading section 40 compares the inputted sample values $Z_{nj}$ with the state sample values Z-bar$_{nj}$ provided from the parallel sampling section 45. The parallel sampling section 45 samples the main sequences generated from the second main SRGs 43 and 44 in conformity with the sampling timing provided from the igniter SRGs 32 and 33 at the time point of $(R+n)N_I$.

If $z_{nj}$ (j=1, 2, . . . , b−1) does not coincide with Z-bar$_{nj}$ (j=1, 2, . . . , b−1), the par correction section 42, for the state correction of the main SRGs, operates one or more correction circuits corresponding to the inconsistent sample pair at the time point $(R+n)N_I+D_C$ including $D_C$ is preferably selected to satisfy the condition $0<D_C\leq N_I$. However, if $z_{nj}$ coincides with Z-bar$_{nj}$, the parallel correction section 42 does not perform any operation.

In the preferred embodiment, the sampling circuit and the correction circuit for the synchronization of the main SRGs 43 and 44 are designed in the same manner as the existing (parallel) DSA.

If an error is detected, according to the preferred embodiment, the verification process for the main sequences is performed in a manner that it is checked whether the symbols conveyed through the comparison of the symbols several times after the synchronization coincide with the symbols generated in the receiver.

Meanwhile, while the state correction and verification process of the main SRGs is performed, i.e., during the conveyance period of the several symbols, the receiver may noncoherently integrate the energies of the despread state symbols to re-discriminate whether the igniter sequences are correctly synchronized, and compare them with the threshold value.

After the cell searching procedure as described above is completed, the receiver despreads the data signal by multiplying the data signal by the scrambling sequences produced by the synchronized main sequences. It then conjugates values of the corresponding Walsh sequences for every user, and coherently demodulates the despread data signal using the channel estimation result of the channel estimator 50. Here, the channel estimation result is obtained using the output of the symbol correlation section 34 for the input state signal and the state samples for the main sequences of the synchronized receiver.

Before preforming the channel estimation, the receiver can only regenerate the state signal (i.e., pilot signal) transmitted by the transmitter in a state having the initial phase ambiguity related to the DPSK modulator. This is because the preferred embodiment of the present invention uses the DPSK-modulated pilot. In order to solve this problem, the preferred embodiment uses the pre-rotation of the data constellation.

Next, the construction and operation of the channel estimator provided in the receiver in the next-generation DS/CDMA system using the D²SA technique will be described.

Most DS/CDMA receivers use the rake structure for coherently combining the respective multi-path data signals, and maximize the signal-to-noise ratio (SNR).

Generally, the pilot channel signal having the form of a non-modulation PN sequence helps the receiver estimate the channel characteristic of the respective paths. This is because the rake receiver is based on the maximum ratio combining (MRC) for the input data signals.

When using the general DSA technique, including the D²SA technique of the preferred embodiment the state signal, i.e., the modulated igniter sequence, should be used not only as the basis of the timing acquisition/tracking, but also as the basis of the channel estimation. According to the present DSA technique, once the igniter sequence and the main sequence are synchronized, the quadrature-modulated igniter sequence can be automatically regenerated in the receiver. This means that once the synchronization process is completed, the igniter sequence quadrature-modulated and inputted is suitable for the basis of the channel estimation.

However, as the preferred embodiment uses the D²SA technique, the DPSK-modulated igniter sequence cannot serve as the basis of the channel estimation without specific measures due to the phase ambiguity problem that may be produced by the DPSK in the channel estimation. Accordingly, when transmitting/receiving the DPSK-modulated pilot, it is very important to solve the phase ambiguity problem that may be produced when the DPSK-modulated pilot is used.

The operation of the channel estimator will now be described.

Referring to FIG. 5, in the n-th symbol interval, the transmitter DPSK pilot symbol $f_n$ and its input symbol $x_n$ take the complex values in the following Equation 1.

$$f_n = \exp(j\theta_n) = \exp\left[j\left(\theta_0 + \sum_{l=1}^{n} \Delta\theta_l\right)\right]$$ [Equation 1]

$$x_n = \exp(j\Delta\theta_n)$$

where $\theta_0$ denotes the initial phase of the transmitter DPSK modulator, and $\Delta\theta_n$ is determined by the b main SRG state samples $z_{nj}(j=0, 1, \ldots, b-1)$.

Next, the state signal is constructed by spreading and power-adjusting the pilot symbol, and then transmitted. The n-th state signal received in the receiver is given by the following Equation 2.

$$r_s^{(n)}(t) = H_n e^{j\Phi_n} \sqrt{P_s}\, e^{j(\theta_0 + \Sigma_{l=1}^{n}\Delta\theta_l)}$$ [Equation 2]

$$\sum_{m=0}^{N_I-1} c_m p_{T_C}(t - [m+(n-1)N_I]T_C) + N_s(t)$$

where $H_n e^{j\Phi_n}$ denotes the channel gain during the transmission of the n-th state signal, $P_S$ the pilot channel power, and $p_{T_C}(t)$ the chip pulse shaping filter whose amplitude is 1 in the interval $[0, T_c]$ and 0, otherwise. The pilot channel noise $N_s(t)$ contains the traffic channel interference, multi-path interference, other cell interference and the thermal noise.

Next, the receiver despreads the incoming state signal with the synchronized igniter sequence, and integrates it for the symbol period "$[(n-1)N_I T_C, nN_I T_C]$" as shown in the following Equation 3 to produce the sufficient statistic for the n-th pilot symbol.

$$g_{s,n} = \frac{1}{\sqrt{N_I T_C}} \int_{nN_I T_C}^{(n-1)N_I T_C} r_s^{(n)}(t)$$ [Equation 3]

$$\sum_{m=1}^{N_I-1} c_m^* p_{T_C}(t - [m+(n-1)N_I]T_C) dt =$$

$$\sqrt{E_s}\, H_n e^{j\Phi_n} e^{j(\phi_0 + \Sigma_{l=1}^{n})\Delta\theta_l} + N_{s,n}$$

where $E_s \underline{\Delta} P_s N_I T_C$, and $N_{s,n}$ is the zero mean circularly-symmetric complex gaussian noise that satisfies the following Equation 4.

$$E\{[Re\{N_{s,n}\}]^2\} = E\{[Im\{N_{s,n}\}]^2\} = N_0/2$$ [Equation 4]

Finally, from $g_{s,n}$ in Equation 3, and the DPSK-decoding operation of $\gamma_n = g_{s,n} \cdot g^*_{s,n}$, the n-th conveyed symbol as in the following equation 5 can be obtained. At this time, the obtained symbol contains the channel noise. Here, $g^*_{s,n-1}$ means the conjugate complex value of $g_{s,n}$.

$$y_n = E_s H_n H_{n-1} e^{j(\Delta\phi_n + \Delta\theta_n)} + \tilde{N}_{s,n} \quad \text{[Equation 5]}$$

where $\Delta\phi_n \triangleq \phi_n - \phi_{s-1}$, and the DPSK demodulator outputs noise expressed by the following Equation 6.

$$\tilde{N}_{s,n} = N_{s,n} N_{s,n-1}^* + \sqrt{E_s} H_n e^{j(\Phi_n + \theta_n)} N_{s,n-1}^* + \sqrt{E_s} H_{n-1} e^{-j(\Phi_{n-1} + \theta_{n-1})} N_{s,n-1} \quad \text{[Equation 6]}$$

In the slowly fading channels, the channel characteristic remains merely constant for several symbol periods, and thus we have $\Delta\phi_n \approx 0$ in Equation 5.

Finally, after the magnitude normalization, the PSK symbol demapping section 36 detects and stores the b state symbols $z_{nj}$(j=0, 1, . . . , b−1), from $y_n$, which are used to synchronize the receiver main SRGs 43 and 44 to the transmitter main SRGs in the DSA despreading section 40.

Once the synchronization of the igniter SRGs and the transmitter main SRGs is completed, the receiver starts to regenerate the DPSK-modulated pilot symbol by sampling the receiver main sequence, which is represented by the following Equation 7.

$$f_{\hat{n}_0+n} = \exp\left(j\theta_{\hat{n}_0+n}\right) = \exp\left\{j\left(\theta_{\hat{n}_0} + \sum_{l=n_0+1}^{n_0+n} \Delta\hat{\theta}_l\right)\right\} \quad \text{[Equation 7]}$$

where $n_0$ denotes the time when the receiver starts to regenerate the pilot symbols after completing the main SRG synchronization, and $\theta_{n0}$ denotes the initial phase of the receiver DPSK modulator. Here, the transmitter and the receiver generate the same differential phase symbols after the synchronization of the main SRGs, but they cannot have the same initial phase. This is expressed by the following Equation 8.

$$\Delta\hat{\theta}_l = \Delta\theta_l, \, l = n_0 + 1, n_0 + 2, \ldots \quad \text{[Equation 8]}$$
$$\hat{\theta}_{n_0} \neq \theta_{n_0}$$

In general, due to the discrepancy of these initial phases, the general low pass filter is not used to get the channel estimation value in accordance with the present invention. The following Equation 9 expresses the output of the low pass filter (LPF) 52 used in the preferred embodiment.

$$v_{n_0+n} = \frac{1}{(2M+1)\sqrt{E_s}} \sum_{l=-M}^{n+M} g_{s,n_0+l} f_{\hat{n}_0+l}^* = \frac{1}{(2M+1)}$$
$$\sum_{l=n-M}^{n+M} H_{n_0+l} e^{j\phi_{n_0+l}} e^{j\left(\theta_{n_0} - \hat{\theta}_{n_0} + \sum_{m=n_0+1}^{n_0+l}\left(\Delta\theta_m - \Delta\hat{\theta}_m\right)\right)} +$$
$$N_{s,\hat{n}_0+n} \approx H_{n_0+n} e^{j\left(\theta_{n_0+n} + \theta_{N_0} - \hat{\theta}_{n_0}\right)} + N_{s,\hat{n}_0+n} \quad \text{[Equation 9]}$$

where 2M+1 denotes the number of averaged symbol periods during which the channel characteristic is assumed to remain nearly constant. The averaged complex gaussian noise $N_{s,n0+n}$ is expressed by the following Equation 10, and is also the zero-mean, circularly symmetric, complex gaussian noise that satisfies the following Equation 11.

$$N_{s,\hat{n}_0+n} \triangleq \frac{1}{2M+1} \sum_{l=n-M}^{n+M} N_{s,n_0+l} \exp\left(-j\theta_{\hat{n}_0+l}\right) \quad \text{[Equation 10]}$$

$$E\left\{\left[Re\{N_{s,\hat{n}_0+n}\}\right]^2\right\} = E\left\{\left[Im\{N_{s,\hat{n}_0+n}\}\right]^2\right\} = \frac{N_0/2}{2M+1} \quad \text{[Equation 11]}$$

On the other hand, the data signal arriving at the receiver is despread by the main sequence and the corresponding Walsh sequence. This despread value is then integrated for the period "[$(n_0+n−1)N_I$, $(n_0+n)N_I$]", producing the sufficient statistic for the $(n_0+n)$th data symbol as shown in the following Equation 12.

$$g_{d,n_0+n} = \sqrt{E_d} H_{n_0+n} e^{j\phi_{n_0+n}} a_{n_0+n} + N_{d,n_0+n} \quad \text{[Equation 12]}$$

where $E_d \triangleq P_x N_I T_C$ is the symbol energy corresponding to the data channel power, and $N_{d,n0+n}$ is the data channel noise. From the Equations 9 and 12, the MRC component value for the data signal inputted through the current path is obtained by the following Equation 13.

$$u_{n_0+n} = \quad \text{[Equation 13]}$$
$$g_{d,n_0+n} v_{n_0+n}^* \approx \sqrt{E_d} H_{n_0+n}^2 e^{j\left(\hat{\phi}_{n_0} - \theta_{n_0}\right)} a_{n_0+n} + N_{d,\tilde{n}_0+n}$$

which will generally cause an incorrect detection of the M-ary MPSK data symbol due to the initial phase discrepancy for $$\left(\hat{\theta}_{n_0} - \theta_{n_0}\right),$$

even when the noise component $N_{d,\tilde{n}_0+n}$ expressed by the following equation 14 becomes very small.

$$\tilde{N}_{d,n_0+n} \equiv \quad \text{[Equation 14]}$$
$$N_{d,n_0+n N_{s,n_0+n}^*} + N_{d,n_0+n} H_{n_0+n} e^{-j\left\{\phi_{n_0+n} + \left(e_{n_0} - \hat{\theta}_{n_0}\right)\right\}} +$$
$$N_{s,\hat{n}_0+n}^* \sqrt{E_d} H_{n_0+n} e^{j\phi_{n_0+n}} a_{n_0+n}$$

The foregoing described why it is troublesome to use a general channel estimator using a simple low pass filter in relation to the $D^2SA$. Hereinafter, the pre-rotation of data constellation used in the present invention will be described.

As described above, according to the present invention, the general low pass filter is not used for obtaining the channel estimation value because of the initial phase discrepancy. That is because the methods of modulating/demodulating the pilot channel and the traffic channel performed by the system using the $D^2SA$ technique are basically different from each other. Specifically, since the pilot channel synchronization should be completed prior to the channel estimation, the noncoherent signaling is performed in conveying the synchronization information (state samples) through the pilot channel, and coherent signaling is performed with respect to the traffic channel data for the better error performance.

In processing the noncoherent pilot signal and the coherent traffic signal, the $D^2SA$ according to the preferred embodiment uses the noncoherent DPSK structure with respect to the pilot channel, and uses the coherent DPSK structure with respect to the traffic channel.

The noncoherent DPSK has been chosen in consideration of its advantage over the noncoherent orthogonal signaling in terms of system complexity and acquisition time performance, which unfortunately brought about the critical problem of initial phase discrepancy between the transmitter and the receiver DPSK modulators.

In order to resolve the phase discrepancy problem, the technique of pre-rotation of data constellation is used.

As can be recognized from Equations 7, 8, and 9, the receiver can easily generate the estimated value of the pilot signal affected by the channel as shown in the following Equation 15.

$$\tilde{v}_{n_0+n} = v_{n_0+n} \hat{f}_{n_0+n} \approx H_{n_0+n} e^{j\left(\phi_{n_0+n}+\theta_{n_0}+\sum_{m=n_0+1}^{n_0+n}\Delta\hat{\theta}_l\right)} + \hat{N}_{s,n_0+n} \cdot e^{j\left(\hat{\theta}_{n_0}+\sum_{m=n_0+1}^{n_0+n}\Delta\hat{\theta}_l\right)} = $$

$$H_{n_0}e^{j(\phi_{n_0+n}+\theta_{n_0+n})} + \hat{N}_{s,n_0+n} \cdot e^{j\hat{\theta}_{n_0+n}}$$
[Equation 15]

Comparing Equations 12 and 15, it can be deduced that the desired channel compensation is realized if the transmitted data symbol $a_{n_0+n}$ is pre-rotated by $\theta_{n_0+n}$ (i.e., pre-multiplied by $e^{j\theta_{n_0+n}}$) in the transmitter.

Specifically, if the receiver despreads and integrates the $(n_0+n)$-th pre-rotated data signal, the sufficient statistic for the data symbol can be produced by the following Equation 16.

$$g_d, \tilde{n}_0 + n = \sqrt{E_d} H_{n_0+n} e^{j(\phi_{n_0+n}+\theta_{n_0+n})} a_{n_0+n} + N_{d,n_0+n}$$
[Equation 16]

At this time, the corresponding MRC component values for the data signals inputted through the current path can be obtained by the following Equation 17.

$$\tilde{u}_{n_0+n} = \tilde{g}_{d,n_0+n} \tilde{v}^*_{n_0+n} \approx \sqrt{E_d} H^2_{n_0+n} a_{n_0+n} + N^{\vee}_{d,n_0+n}$$
[Equation 17]

Here, the noise component $$N^{\vee}_{d,n_0+n}$$

is given by the following Equation 18.

$$N^{\vee}_{d,n_0+n} =$$
[Equation 18]

$$e^{-j\hat{\theta}_{n_0+n}}\left\{N_{d,n_0+n}\hat{N}^*_{s,n_0+n} + N_{d,n_0+n}e^{-j\left\{\phi_{n_0+n}+\left(\theta_{n_0}-\hat{\theta}_{n_0}\right)\right\}} + \hat{N}^*_{s,n_0+n}\sqrt{E_d}H_{n_0+n}e^{j(\phi_{n_0+n}+\theta_{n_0+n})}a_{n_0+n}\right\}$$

Here, $$\overset{\vee}{N}_{d,n_0+n} \text{ has the same statistical characteristic as } N_{d,n_0+n}$$

in Equation 13. This means that the D²SA system incorporated with the pre-rotation and modified channel estimation achieves the same data error performance as the related art coherent MPSK receiver having no initial phase discrepancy problem.

The pre-rotation in the transmitter and the generation of the modified estimate value $$\tilde{v}_{n_0+n}$$

in the receiver are incorporated in FIGS. 3A and 5, respectively (see the dotted lines in FIGS. 3A and 5).

As described above, the present invention as embodied and broadly described has many advantages. For example, the preferred embodiment uses the D²SA technique. This is an improved distributed sample acquisition technique, and is used in the low SNR DS/CDMA environment.

In the D²SA technique according to the preferred embodiment, the state samples are conveyed through the CDMA channel of a low SNR, and the igniter sequence and the distributed sample scrambling (DSS) technique are used for operating the state samples conveyed for the synchronization of the main SRG.

The D²SA technique plays the same role as the existing DSA technique on the point of reducing the implementation complexity and improving the code acquisition time, but it is discriminated from the existing DSA technique on the point of using the DPSK signaling instead of orthogonal signaling.

From the foregoing, the high-speed cell searching method and the apparatus therefor using the DPSK-based distributed sample acquisition have the following effects.

First, since a signal correlator is used in case of using the D²SA technique of the present invention, the inefficiency problem of the existing DSA technique that requires $2^b$ parallel correlators (in case of conveying b state samples) can be resolved.

Second, according to the preferred embodiment, the concept of data constellation pre-rotation is the key contributor of the D²SA technique as it can resolve the phase ambiguity problem that appears when using the DPSK modulated igniter sequence as the pilot signal which takes the role of channel estimation reference as well as synchronization reference. The pre-rotation of the data constellation eliminates the initial phase discrepancy between the transmitter and the receiver modulators, thereby rendering an easy estimation of the channel gain of the corresponding signal path through a simple low pass filter and a DPSK modulator.

Third, both the DSA and the D²SA dramatically outperform the conventional SSA in the very low SNR environment of about −14 dB when the respective mean code acquisition times are analyzed using the DSA technique for $2^b$-ary orthogonal signaling and the D2 SA technique of the present invention. Specifically, the DSA and the D2SA are about 100 times faster than the conventional SSA for a PN sequence of a period of $2^{15}-1$.

Fourth, between the DSA and the D²SA techniques, the D²SA outperforms the DSA for the binary (b=1) and quaternary (b=2) signaling cases.

Fifth, according to the preferred embodiment since the simple noncoherent delay-locked loop (DLL) illustrated in FIG. 4B can be used in tracking the accurate chip timing after the completion of the igniter sequence acquisition, the synchronization performance can be considerably improved in comparison to the complicated tracking loop required in the DSA for the accurate chip timing tracking of the orthogonally modulated igniter sequence.

Sixth, since the D²SA technique based on the state estimation is applied for the discrimination and synchronization for the sequences in the next-generation DS/CDMA system for the code acquisition, it can more rapidly acquire the sequences to be synchronized in the DS/CDMA system using a plurality of long-period sequences using a more simplified hardware construction.

Seventh, by using the DPSK modulation for the state sample conveyance for the main SRG, only one correlator is required for the igniter sequence acquisition irrespective of the number b of the state samples which are simultaneously sampled in the SRG generating the long-period PN sequences. Specifically, since the preferred embodiment uses only one correlator for the code acquisition, the implementation of a circuit for code tracking performed after the code acquisition can be greatly simplified. The system complexity and the system performance for the acquisition time can be improved using the DPSK modulation scheme instead of the orthogonal modulation scheme as the means for conveying the state symbols.

Eighth, though the channel estimation using the pilot signal conveyed by the state sample is generally impossible since the transmitter uses the DPSK modulation and the receiver cannot recognize the initial phase information for the DPSK modulation of the transmitter, the preferred embodiment uses the data constellation pre-rotation technique to solve the time-advance phase discrepancy, and thus the coherent detection of data conveyed through the traffic channel is possible.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A high-speed cell search and channel estimation apparatus using a differential phase shift keying (DPSK) based distributed sample acquisition ($D^2SA$) technique, comprising:
   a distributed sample acquisition (DSA) spreading section to pre-sample b stare values of at least one main sequence generator that generates at least one main sequence, and spread and scramble user data whose constellation is pre-rotated by scrambling sequences generated using the at least one main sequence; and
   a sample spreading section to modulate state samples outputted from the DSA spreading section to DPSK symbols, and spread the modulated DPSK symbols by an igniter sequence to output a state signal.

2. The apparatus of claim 1, wherein the DSA spreading section comprises:
   the at least one main sequence generator to generate the at least one main sequence;
   a time-advanced parallel sampling section to pre-sample states of the at least one main sequence generator;
   at least one spreader to spread the user data by quadrature Walsh codes; and
   at least one scrambler to scramble the user data spread by the quadrature Walsh codes by a complex type scrambling code generated from the at least one main sequence generator.

3. The apparatus of claim 1, wherein the sample spreading section comprises:
   a phase shift keying (PSK) symbol mapping section to map the state samples outputted from the DSA spreading section onto a complex symbol and output corresponding PSK symbols;
   a DPSK encoding section to encode the PSK symbols by adding a phase, integrated until a previous symbol time, to a phase of the PSK symbols outputted from the PSK symbol mapping section;
   at least one igniter sequence generator to generate igniter sequences to spread the DPSK symbols; and
   a spreader to spread the DPSK symbols by complex igniter sequences generated from the at least one igniter sequence generator, and output the state signal.

4. A high-speed cell search and channel estimation apparatus using a differential phase shift keying (DPSK) based distributed sample acquisition ($D^2SA$) technique; comprising:
   a sample despreading section to acquire a corresponding igniter sequence from a state signal outputted from a transmitter, despread the state signal using the acquired igniter sequence, and demodulate the despread state signal;
   a distributed sample acquisition (DSA) despreading section to synchronize transmitter and receiver sequence generators by comparing state sample values of at least one main sequence generator that generates at least one main sequence with state sample values demodulated by the sample despreading section, and despread and descramble spread user data by a descrambling sequence generated using the at least one main sequence corresponding to a synchronization timing; and
   a channel estimator to estimate a channel gain and a carrier phase by multiplying a value obtained by DPSK-encoding the state sample values for the at least one main sequence generator of the DSA despreading section by the state signal despread by the sample despreading section, and multiplying a spread output value by a filtered value thereof, and output a multiplied value for use in user data despreading and descrambling of the DSA despreading section.

5. The apparatus of claim 4, wherein the sample despreading section comprises:
   at least one igniter sequence generator to generate igniter sequences;
   a despreader to despread the state signal from the igniter sequences generated from the at least one igniter sequence generator;
   a symbol correlation section to perform a correlation detection with respect to the state signal despread by the igniter sequences;
   a decoder to DPSK-decode an output value of the symbol correlation section; and
   a PSK symbol demapping section to detect the symbols decoded by the decoder and output state samples.

6. The apparatus of claim 4, wherein the DSA despreading section comprises:
   the at least one main sequence generator to generate the at least one main sequence;
   a parallel sampling section configured to sample states of the at least one main sequence generator in conformity with a sampling timing provided from at least one igniter sequence the generator of the sample despreading section;
   a parallel comparing section configured to compare state samples outputted from the sample despreading section with state samples outputted from the parallel sampling section;

a parallel correction section to repeatedly correct states of the at least one main sequence generator in accordance with a correction timing provided from the at least one igniter sequence generator of the sample despreading section and a comparison result of the parallel comparing section;

a descrambler to descramble the data signal received from the DSA spreading section by complex type descrambling sequences generated from the at least one main sequence generator;

a despreader to despread the signal descrambled by the scrambling sequences by quadrature Walsh codes;

a data symbol correlation section to correlation-integrate the signal despread by the quadrature Walsh codes through the despreader in a unit of a data symbol; and a multiplier to multiply the estimation value of the channel estimator by the output of the data symbol correlation section and output a synchronized data signal.

7. The apparatus of claim 4, wherein the channel estimator comprises:

a depletion encoding section to depletion-encode the state sample values for the at least one main sequence generator of the DSA despreading section;

a first multiplier to multiply an output of the depletion encoding section and the state signal despread by the sample despreading section;

a filter to filter an output value of the multiplier; and a second multiplier to multiply the value outputted from the filter by the value outputted from the depletion encoding section, and output the channel estimation value to estimate the channel gain and the carrier phase.

8. A high-speed cell search and channel estimation apparatus using a differential phase shift keying (DPSK) based distributed sample acquisition ($D^2SA$) technique, comprising:

a transmitter configured to sample a plurality of state values of at least one first main sequence, modulate state samples into DPSK symbols, spread the modulated DPSK symbols by a first igniter sequence, and transmit the spread symbols as a state signal, wherein the transmitter spreads constellation pre-rotated user data by a scrambling sequence using the at least one first main sequence, and transmits the spread user data; and a receiver configured to acquire a corresponding first igniter sequence from the state signal outputted from the transmitter, despread the state signal by the acquired first igniter sequence, demodulate the despread state signal, synchronize transmitter and receiver generators by comparing state sample values of at least one second main sequence generator which generates at least one second main sequence with the demodulated state sample values, and despread and descramble the user data from the transmitter using the at least one second main sequence corresponding to a synchronization timing and a channel estimator.

9. The apparatus of claim 8, wherein the transmitter comprises:

a distributed sample acquisition (DSA) spreading section to pre-sample b state values of at least one first main sequence generator that generates the at least one first main sequence, and spread and scramble user data whose constellation is pre-rotated by scrambling sequences generated using the at least one first main sequence; and a sample spreading section to modulate the state samples outputted from the DSA spreading section to the DPSK symbols, and spread the modulated DPSK symbols by the first igniter sequence to output the spread symbols.

10. The apparatus of claim 9, wherein the DSA spreading section comprises:

the at least one first main sequence generator to generate the at least one first main sequence;

a time-advanced parallel sampling section to pre-sample states of the at least one first main sequence generator;

at least one spreader to spread the user data by quadrature Walsh codes; and at least one scrambler to scramble the user data spread by the quadrature Walsh codes by a complex type scrambling code generated from the at least one first main sequence generator.

11. The apparatus of claim 9, wherein the sample spreading section comprises:

a phase shift keying (PSK) symbol mapping section to map the state samples outputted from the DSA spreading section onto a complex symbol and output corresponding PSK symbols.

a DPSK encoding section to encode the PSK symbols by adding a phase integrated until a previous symbol time, to a phase of the PSK symbols outputted from the PSK symbol mapping section;

at least one first igniter sequence generator to generate first igniter sequences to spread the encoded DPSK symbols; and a spreader to spread the DPSK symbols by the complex igniter sequences generated from the at least one first igniter sequence generator, and output the state signal.

12. The apparatus of claim 9, wherein a state of the at least one second main sequence generated from the at least one second main sequence generator coincide with a state of the first main sequence of the DSA spreading section.

13. The apparatus of claim 8, wherein the receiver comprises:

a sample despreading section to acquire a corresponding igniter sequence from the state signal outputted from the transmitter, despread the state signal by the acquired igniter sequence, and demodulate the despread state signal;

a distributed sample acquisition (DSA) despreading section to synchronize the transmitter and receiver sequence generators by comparing state sample values of the at least one second main sequence generator that generates the at least one second main sequence with the state sample values demodulated by the sample despreading section, and despread and descramble the spread user data by a descrambling sequence generated using the at least one second main sequence corresponding to a synchronization timing; and a channel estimator to estimate a channel gain and a carrier phase by multiplying a value obtained by DPSK-encoding the state sample values for the at least one second main sequence generator of the DSA despreading section by the state signal despread by the sample despreading section and multiplying a spread output value by a low-pass-filtered value thereof, and output a multiplied value for use in user data despreading and descrambling of the DSA despreading section.

14. The apparatus of claim 13, wherein the sample despreading section comprises:

at least one second igniter sequence generator to generate second igniter sequences;

a despreader to despread the state signal from the second igniter sequences generated from the at least one second igniter sequence generator; and a symbol correlation section to perform a correlation detection with respect to the state signal despread by the second igniter sequences.

15. The apparatus of claim 14, wherein the sample despreading section further comprises:

a decoding section to DPSK-decode an output value of the symbol correlation section; and a PSK symbol demapping section to detect the symbols decoded by the decoding section and output state samples.

16. The apparatus of claim 14, wherein the DSA despreading section comprises:

the at least one second main sequence generator to generate the at least one second main sequence;

a parallel sampling section to sample states of the at least one second main sequence generator in conformity with a sampling timing provided from the at least one second igniter sequence generator of the sample despreading section;

a parallel comparing section to compare state samples outputted form the sample despreading section with state samples outputted from the parallel sampling section; and a parallel correction section to repeatedly correct the states of the at least one second main sequence generator in accordance with a correction timing provided from the at least one second igniter sequence generator of the sample despreading section and a comparison result of the parallel comparing section.

17. The apparatus of claim 16, wherein the DSA despreading section further comprises:

a descrambler to descramble a data signal received from the transmitter by complex type descrambling sequences generated by the at least one second main sequence generator;

a despreader to despread a signal descrambled by the scrambling sequences by quadrature Walsh codes;

a data symbol correlation section to correlation-integrate the signal despread by the quadrature Walsh codes through the despreader in a unit of a data symbol; and a multiplier to multiply an estimation value of the channel estimator by the output of the data symbol correlation section and output a finally synchronized data signal.

18. The apparatus of claim 13, wherein the channel estimator comprises:

a depletion encoding section to depletion-encode the state sample values for the at least one second main sequence generator of the DSA despreading section;

a first multiplier to multiply an output of the depletion encoding section and the state signal despread by the sample despreading section;

a filter to filter an output value of the multiplier; and a second multiplier to multiply a value outputted from the filter by a value outputted from the depletion encoding section, and output the channel estimation value to estimate the channel gain and the carrier phase.

19. The apparatus of claim 18, wherein the depletion encoding section comprises:

a phase shift keying (PSK) symbol mapping section to map the state samples outputted from the DSA despreading section onto respective complex symbols as PSK symbols; and an encoding section to produce DPSK symbols by adding a phase, integrated until a previous symbol time, to a phase of the PSK symbols.

20. A method of high-speed cell searching using a differential phase shift keying (DPSK) based distributed sample acquisition ($D^2SA$) technique, comprising:

pre-sampling b state values of at least one main sequence generator that generates at least one main sequence;

DPSK-modulating the sampled state values into DPSK-modulated symbol values;

multiplying respective user data by the DPSK-modulated symbol values;

transmitting a state signal obtained by spreading the DPSK-modulated symbol values by a generated igniter sequence, and transmitting a data signal obtained by modulating the respective user data multiplied by the DPSK-modulated symbol values;

synchronizing states of respective transmitter and receiver sequence generators after acquiring the igniter sequence from the transmitted state signal; and tracking and estimating gains of a pilot channel and a traffic channel and a carrier phase after synchronization.

21. A transmitter for a high-speed cell search and channel estimation apparatus using a differential phase shift keying (DPSK) based distributed sample acquisition $D^2SA$ technique, comprising:

at least one main sequence generator to generate at least one main sequence;

a distributed sample acquisition (DSA) spreader, configured to pre-sample a prescribed number of state values of the at least one main sequence generator, and spread and scramble user data, a constellation of which is pre-rotated by scrambling sequences generated using the at least one main sequence; and a sample spreading section, configured to modulate the state samples outputted from the DSA spreader to DPSK symbols, and spread the modulated DPSK symbols by at least one igniter sequence to output the spread symbols.

22. A receiver for a high-speed cell search and channel estimation apparatus using a differential phase shift keying (DPSK) based distributed sample acquisition $D^2SA$ technique, comprising:

a sample despreader, configured to acquire a corresponding igniter sequence from a state signal outputted from a transmitter, despread the state signal using the acquired igniter sequence, and demodulate the despread state signal;

a distributed sample acquisition (DSA) despreader, configured to synchronize transmitter and receiver sequence generators by comparing state sample values of the receiver sequence generator with the state sample values demodulated by the sample despreader, and despread and descramble spread user data by a descrambling sequence generated using a main sequence corresponding to a synchronization timing; and a channel estimator, configured to estimate a channel gain and a carrier phase by multiplying a value obtained by DPSK-encoding the state sample values for the receiver sequence generator of the DSA despreader by the state signal despread by the sample despreader, and multiplying a spread output value by a filtered value thereof, and output a multiplied value for use in user data despreading and descrambling of the DSA despreader.

* * * * *